United States Patent [19]

Stevens et al.

[11] Patent Number: 5,446,863

[45] Date of Patent: Aug. 29, 1995

[54] CACHE SNOOP LATENCY PREVENTION APPARATUS

[75] Inventors: Jeffrey C. Stevens, Spring; Jens K. Ramsey, Houston; Randy M. Bonella, Cypress; Philip C. Kelly, Houston, all of Tex.

[73] Assignee: Compaq Computer Corporation, Houston, Tex.

[21] Appl. No.: 168,718

[22] Filed: Dec. 16, 1993

Related U.S. Application Data

[62] Division of Ser. No. 839,853, Feb. 21, 1992.

[51] Int. Cl.[6] .............................................. G06F 12/12
[52] U.S. Cl. .................................................. 395/427
[58] Field of Search ....................................... 395/425

[56] References Cited

U.S. PATENT DOCUMENTS 5,119,485  6/1992  Ledbetter, Jr. et al. ............ 395/425

FOREIGN PATENT DOCUMENTS 0090575  10/1983  European Pat. Off. .
0288649  11/1988  European Pat. Off. .

OTHER PUBLICATIONS

Practical Cache Design Techniques for Today's RISC and CISC CPUS, Jim Handy, Electro Conference Record, vol. 16, Apr. 16, 1991, pp. 283–288.

Futurebus+ Cache Coherence Jay Cantrell, Ire Wescon Convention Record, vol. 34, Nov., 1990, pp. 90–94.

*Primary Examiner*—David L. Robertson
*Attorney, Agent, or Firm*—Pravel, Hewitt, Kimball & Krieger

[57] ABSTRACT

A method and apparatus for reducing the snooping requirements of a cache system and for reducing latency problems in a cache system. When a snoop access occurs to the cache, and if snoop control logic determines that the previous snoop access involved the same memory location line, then the snoop control logic does not direct the cache to snoop this subsequent access. This eases the snooping burden of the cache and thus increases the efficiency of the processor working out of the cache during this time. When a multilevel cache system is implemented, the snoop control logic directs the cache to snoop certain subsequent accesses to a previously snooped line in order to prevent cache coherency problems from arising. Latency reduction logic which reduces latency problems in the snooping operation of the cache is also included. After every processor read that is transmitted beyond the cache, i.e., cache read misses, the logic gains control of the address inputs of the cache for snooping purposes. The cache no longer needs its address bus for the read cycle and thus the read operation continues unhindered. In addition, the cache is prepared for an upcoming snoop cycle.

3 Claims, 4 Drawing Sheets

CACHE SNOOP LATENCY PREVENTION APPARATUS

This is a divisional, of application Ser. No. 07/839,853, filed Feb. 21, 1992.

BACKGROUND OF THE INVENTION

1. Field of the Invention

The present invention relates to microprocessor cache subsystems in computer systems, and more specifically to a method and apparatus for decreasing the snooping requirements and reducing latency problems in a cache system.

2. Description of the Related Art

The driving force behind computer system innovation has been the demand for faster and more powerful personal computers. A major bottleneck in personal computer speed has historically been the speed with which data can be accessed from memory, referred to as the memory access time. The microprocessor, with its relatively fast processor cycle times, has generally been delayed by the use of wait states during memory accesses to account for the relatively slow memory access times. Therefore, improvement in memory access times has been one of the major areas of research in enhancing computer performance.

In order to bridge the gap between fast processor cycle times and slow memory access times, cache memory was developed. A cache is a small amount of very fast, and expensive, zero wait state memory that is used to store a copy of frequently accessed code and data from main memory. The microprocessor can operate out of this very fast memory and thereby reduce the number of wait states that must be interposed during memory accesses. When the processor requests data from memory and the data resides in the cache, then a cache read hit takes place, and the data from the memory access can be returned to the processor from the cache without incurring wait states. If the data is not in the cache, then a cache read miss takes place. In a cache read miss, the memory request is forwarded to the system, and the data is retrieved from main memory, as would normally be done if the cache did not exist. On a cache miss, the data that is retrieved from memory is provided to the processor and is also written into the cache due to the statistical likelihood that this data will be requested again by the processor.

An efficient cache yields a high "hit rate" which is the percentage of cache hits that occur during all memory accesses. When a cache has a high hit rate, the majority of memory accesses are serviced with zero wait states. The net effect of a high cache hit rate is that the wait states incurred on a relatively infrequent miss are averaged over a large number of zero wait state cache hit accesses, resulting in an average of nearly zero wait states per access. Also, since a cache is usually located on the local bus of the microprocessor, cache hits are serviced locally without requiring use of the system bus. Therefore, a processor operating out of its local cache has a much lower "bus utilization." This reduces system bus bandwidth used by the processor, making more bandwidth available for other devices, such as intelligent bus masters, which can independently gain access to the bus.

Another important feature of caches is that the processor can operate out of its local cache when it does not have control of the system bus, thereby increasing the efficiency of the computer system. In systems without microprocessor caches, the processor generally must remain idle while it does not have control of the system bus. This reduces the overall efficiency of the computer system because the processor cannot do any useful work at this time. However, if the processor includes a cache placed on its local bus, it can retrieve the necessary code and data from its cache to perform useful work while other devices have control of the system bus, thereby increasing system efficiency.

Important considerations in cache performance are the organization of the cache and the cache management policies that are employed in the cache. A cache can generally be organized into either a direct-mapped or set-associative configuration. In a direct-mapped organization, the physical address space of the computer is conceptually divided up into a number of equal pages, with the page size equaling the size of the cache. The cache is partitioned into a number of sets, with each set having a certain number of lines. The line size is generally a plurality of dwords, wherein a dword is 32 bits. Each of the conceptual pages in main memory has a number of lines equivalent to the number of lines in the cache, and each line from a respective page in main memory corresponds to a similarly located line in the cache. An important characteristic of a direct-mapped cache is that each memory line from a conceptual page in main memory, referred to as a page offset, can only reside in the equivalently located line or page offset in the cache. Due to this restriction, the cache only need refer to a certain number of the upper address bits of a memory address, referred to as a tag, to determine if a copy of the data from the respective memory address resides in the cache because the lower order address bits are pre-determined by the page offset of the memory address.

Whereas a direct-mapped cache is organized as one bank of memory that is equivalent in size to a conceptual page in main memory, a set-associative cache includes a number of banks, or ways, of memory that are each equivalent in size to a conceptual page in main memory. Accordingly, a page offset in main memory can be mapped to a number of locations in the cache equal to the number of ways in the cache. For example, in a 4-way set associative cache, a line or page offset from main memory can reside in the equivalent page offset location in any of the four ways of the cache. As with a direct-mapped cache, each of the ways in a multiple way cache is partitioned into a number of sets each having a certain number of lines. A set-associative cache also generally includes a replacement algorithm, such as a least recently used (LRU) algorithm, that determines which bank, or way, with which to fill data when a read miss occurs.

Cache management is generally performed by a device referred to as a cache controller. One cache management duty performed by the cache controller is the handling of processor writes to memory. The manner in which write operations are handled determines whether a cache is designated as "write-through" or "write-back." When the processor initiates a write to main memory, the cache is first checked to determine if a copy of the data from this location resides in the cache. If a processor write hit occurs in a write-back cache design, then the cache location is updated with the new data, and main memory is only updated later if this data is requested by another device, such as a bus master. Alternatively, the cache maintains the correct or "clean" copy of data thereafter, and the main memory is only updated when a flush operation occurs. In a write-through cache, the main memory location is generally updated in conjunction with the cache location on a processor write hit. If a processor write miss occurs to a write-through cache, the cache controller may either ignore the write miss or may perform a "write-allocate," whereby the cache controller allocates a new line in the cache in addition to passing the data to the main memory. In a write-back cache design, the cache controller generally allocates a new line in the cache when a processor write miss occurs. This generally involves reading the remaining entries from main memory to fill the line in addition to allocating the new write data.

The cache controller includes a directory that holds an associated entry for each set in the cache. In a write-through cache, this entry generally has three components: a tag, a tag valid bit, and a number of line valid bits equaling the number of lines in each cache set. The tag acts as a main memory page number, and it holds the upper address bits of the particular page in main memory from which the copy of data residing in the respective set of the cache originated. The status of the tag valid bit determines whether the data in the respective set of the cache is considered valid or invalid. If the tag valid bit is clear, then the entire set is considered invalid. If the tag valid bit is true, then an individual line within the set is considered valid or invalid depending on the status of its respective line valid bit. In a write-back cache, the entries in the cache directory are generally comprised of a tag and a number of tag state bits for each of the lines in each set. As before, the tag comprises the upper address bits of the particular page in main memory from which the copy originated. The tag state bits determine the status of the data for each respective line, i.e., whether the data is invalid, modified (owned), or clean.

A principal cache management policy is the preservation of cache coherency. Cache coherency refers to the requirement that any copy of data in a cache must be identical to (or actually be) the owner of that location's data. The owner of a location's data is generally defined as the respective location having the most recent or the correct version of data. The owner of data is generally either an unmodified location in main memory, or a modified location in a write-back cache.

In computer systems where independent bus masters can access memory, there is a possibility that a bus master, such as a direct memory access controller, network or disk interface card, or video graphics card, might alter the contents of a main memory location that is duplicated in the cache. When this occurs, the cache is said to hold "stale," "dirty" or invalid data. Also, when the processor executes a cache write hit operation to a write-back cache, the cache receives the new data, but main memory is not updated until a later time, if at all. In this instance, the cache contains a "clean" or correct version of the data and is said to own the location, and main memory holds invalid or "dirty" data. Problems would arise if the processor was allowed to access dirty data from the cache, or if a bus master was allowed to access dirty data from main memory. Therefore, in order to maintain cache coherency, i.e., in order to prevent a device such as a processor or bus master from inadvertently receiving incorrect or dirty data, it is necessary for the cache controller to monitor the system bus for bus master accesses to main memory when the processor does not control the system bus. This method of monitoring the bus is referred to as snooping.

In a write-back cache design, the cache controller must monitor the system bus during memory reads by a bus master because of the possibility that the cache may own the location, i.e., the cache may contain the only correct copy of data for this location, referred to as modified data. This is referred to as read snooping. On a read snoop hit where the cache contains modified data, the cache controller generally provides the respective data to main memory, and the requesting bus master generally reads this data en route from the cache controller to main memory, this operation being referred to as snarfing. Alternatively, the cache controller provides the respective data directly to the bus master and not to main memory. In this alternative scheme, the main memory would perpetually contain erroneous or "dirty" data until a cache flush occurred.

In both write-back and write-through cache designs, the cache controller must also monitor the system bus during bus master writes to memory because the bus master may write to or alter a memory location having data that resides in the cache. This is referred to as write snooping. On a write snoop hit to a write-through cache, the cache entry is generally marked invalid in the cache directory by the cache controller, signifying that this entry is no longer correct. In a write-back cache, the cache is updated along with main memory, and the tag states bits are set to indicate that the respective cache location now includes a clean copy of the data. Alternatively, a write-back cache may invalidate the entire line on a snoop write hit. Therefore, in a write-back cache design, the cache controller must snoop both bus master reads and writes to main memory. In a write-through cache design, the cache controller need only snoop bus master writes to main memory.

The process of snooping generally entails that the cache controller latch the system bus address and perform a cache look-up in the tag directory corresponding to the page offset location where the memory access occurred to see if a copy of data from the main memory location being accessed also resides in the cache. If a copy of the data from this location does reside in the cache, then the cache controller takes the appropriate action depending on whether a write-back or write-through cache design has been implemented, or whether a read or write snoop hit has occurred. This prevents incompatible data from being stored in main memory and the cache, thereby preserving cache coherency.

Another problem that occurs where cache systems are utilized is that, when the respective processor is not in control of the system bus, the cache must be able to both service local requests from the processor and snoop the system bus for memory accesses by other devices. Latency problems can arise where the processor is operating out of the cache and a snooping operation is required due to a pending bus master memory access cycle on the system bus. If the cache is busy servicing a processor access while a bus master memory access is occurring on the bus, the processor access may not complete before the respective bus master cycle completes. If this occurs, the cache will miss a snoop cycle, thus resulting in potential erroneous data in the cache and possible erroneous operation. This condition is exacerbated when logic external to the cache controller controls cache snoop accesses to the system bus. Therefore, a method and apparatus is desired to prevent latency problems from occurring in a cache resulting from its dual requirement that it simultaneously service processor accesses and snoop accesses.

Background on multilevel cache systems is deemed appropriate. Caches have generally been designed independently of the microprocessor. The cache is placed on the local bus of the microprocessor and interfaced between the processor and the system bus during the design of the computer system. However, with the development of higher transistor density computer chips, many processors are currently being designed with an on-chip cache in order to meet performance goals with regard to memory access times. The on-chip cache used in these processors is generally small, an exemplary size being 8 kbytes in size. The smaller, on-chip cache is generally faster than a large off-chip cache and reduces the gap between fast processor cycle times and the relatively slow access times of large caches.

In computer systems that utilize processors with on-chip caches, an external, second level cache is often added to the system to further improve memory access time. The second level cache is generally much larger than the on-chip cache, and, when used in conjunction with the on-chip cache, provides a greater overall hit rate than the on-chip cache would provide by itself.

In systems that incorporate multiple levels of caches, when the processor requests data from memory, the on-chip or first level cache is first checked to see if a copy of the data resides there. If so, then a first level cache hit occurs, and the first level cache provides the appropriate data to the processor. If a first level cache miss occurs, then the second level cache is then checked. If a second level cache hit occurs, then the data is provided from the second level cache to the processor. If a second level cache miss occurs, then the data is retrieved from main memory. Write operations are similar, with mixing and matching of the operations discussed above being possible.

In many instances where multilevel cache hierarchies exist with multiple processors, a property referred to as multilevel inclusion may be implemented in the hierarchy. Multilevel inclusion provides that the second level cache is guaranteed to have a copy of what is inside the first level, or on-chip cache. When this occurs, the second level cache is said to hold a superset of the first level cache. When multilevel inclusion is implemented, and certain criteria are met, it is possible for the second level cache to perform the snooping responsibilities for both caches. For more information on this feature, please see related application Ser. No. 07/538,874 filed Jun. 15, 1990 titled "Multilevel Inclusion in Multilevel Cache Hierarchies," which is hereby incorporated by reference. In multilevel cache systems where multilevel inclusion is not implemented, it is generally necessary for each cache to snoop the system bus during memory accesses by other bus masters in order to maintain cache coherency.

SUMMARY OF THE INVENTION

The present invention comprises a method and apparatus for reducing the snooping requirements and reducing latency problems in a cache system. The present invention is incorporated into a computer system which includes a first level and second level cache. The first level cache is a write-through cache and the second level cache is preferably a write-back cache. Multi-level inclusion is not incorporated, and thus the first level cache would generally be required to snoop all bus master write operations to main memory.

Logic is provided which reduces latency problems in the snooping operation of the first level cache. As discussed in the background of the invention, latency problems may result in cache systems from the dual requirement that a cache both service accesses from the processor and snoop system bus memory accesses. In the preferred embodiment of the invention, in every processor read that is transmitted to the second level cache, i.e., first level cache read misses, latency reduction logic in the second level cache controller gains control of the address inputs of the first level cache for snooping purposes. Since the first level cache has already presented the respective address of the data that it requests to the second level cache, the first level cache no longer needs its address bus for the read cycle anyway. Thus, the read operation continues unhindered, and in addition, the first level cache is prepared for an upcoming snoop cycle.

Therefore, a method and apparatus for reducing the latency problems in the snooping operations of a cache system are disclosed.

BRIEF DESCRIPTION OF THE DRAWINGS

A better understanding of the present invention can be obtained with the following detailed description of the preferred embodiment is considered in conjunction with the following drawings, in which.

DETAILED DESCRIPTION OF THE SPECIFIC EMBODIMENTS

The present invention is incorporated into a modular computer system in the disclosed embodiment. However, it is noted that the invention can be incorporated into virtually any type of computer system, and the following description is intended to describe one environment in which the present invention operates. In the description that follows, a signal name followed by an L indicates that the signal is asserted when it has a logic low value and is the inverse of the signal without an L.

Figure 1:
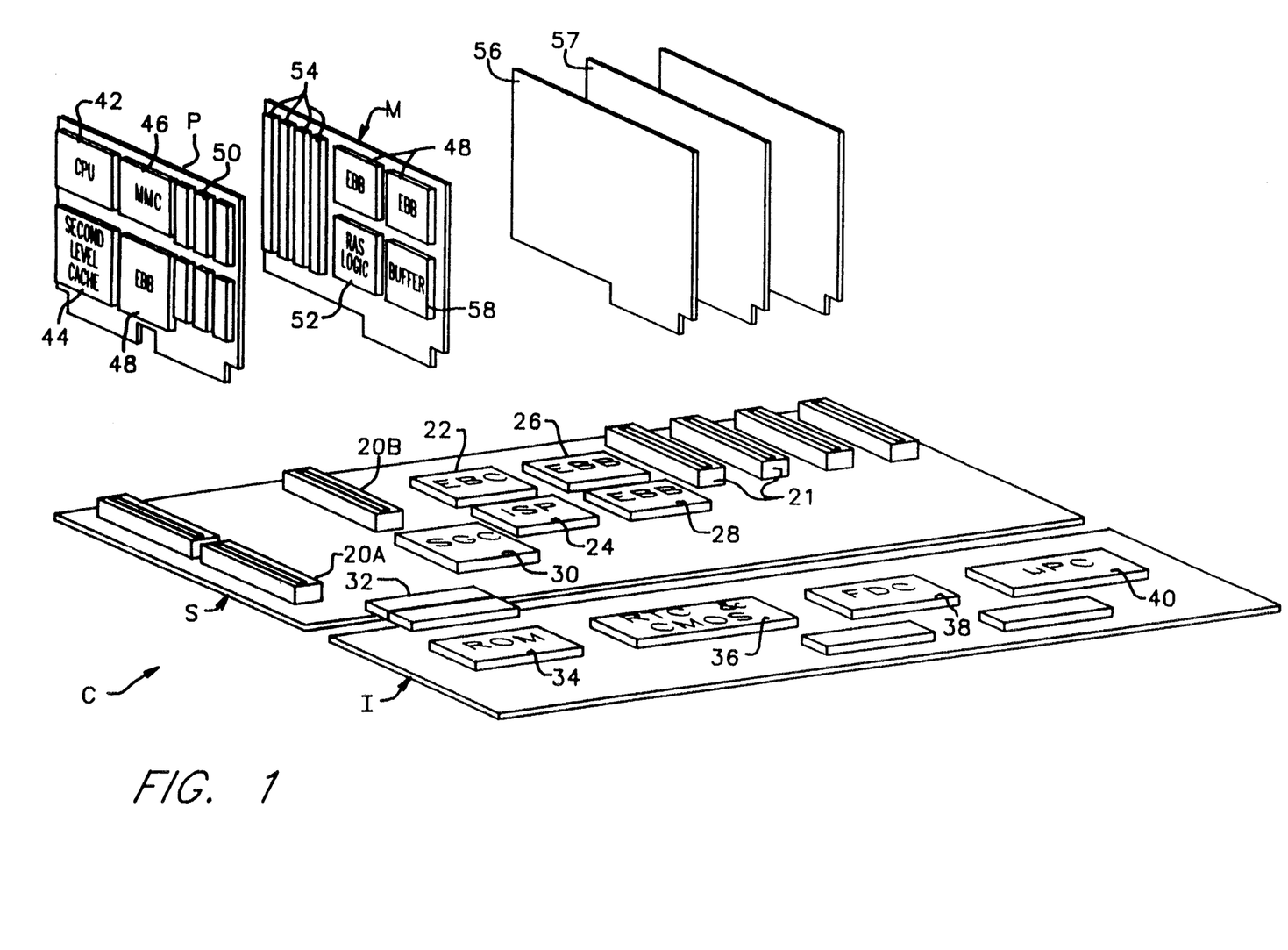
FIG. 1 is an exploded, perspective illustration of a modular computer system incorporating snoop control logic and latency prevention logic according to the present invention.

Description of the Computer System of FIG. 1

A modular computer system generally referred to by the letter C is shown in FIG. 1. The system C includes a system board S, which includes a number of devices and a series of connectors or slots 20A, 20B and 21. The slots 20A and 20B are connected together by means of a system bus or host bus 80 (FIG. 2), and the slots 21 are connected together by an input/output (I/O) bus referred to as the Extended Industry Standard Architecture (EISA) bus (not shown). The circuitry located on the system board S includes a bus controller 22, referred to as the EISA bus controller (EBC), which controls operations on the EISA bus and interfaces between the host bus 80 and the EISA bus. Related to the bus controller 22 is an integrated system peripheral (ISP) 24 which contains an interrupt controller, various timers, a direct memory access (DMA) controller, non-maskable interrupt logic refresh and EISA bus arbitration and prioritization logic. In addition, various data latches/buffers and address latches/buffers referred to as EISA bus buffers (EBBs) 26 and 28 are provided to couple to the EISA bus. Further, a random logic chip 30, commonly referred to as a system glue chip (SGC), is provided to reduce the overall space and component count of the system board S.

An I/O board I is connected to the system board S by a connector 32. The I/O board I contains certain input/output related functions and other functions as commonly developed on the X bus of a personal computer system according to the ISA or EISA architecture. For example, read only memory (ROM) 34 is located on the I/O board I. Additionally a real time clock (RTC) and CMOS memory unit 36, a floppy disk controller (FDC) 38 and a multiple peripheral controller (MPC) 40, which incorporates two serial ports, a parallel port and a hard disk interface, are also located on the I/O board I. Further, a keyboard controller (not shown) is located on the I/O board I.

A processor card P is located in the interchangeable slot 20A. The processor card P includes a central processing unit (CPU) or microprocessor 42. The CPU 42 is preferably the i486 processor by Intel Corporation. The processor card P also includes a multilevel cache system in the disclosed embodiment. Although the disclosed embodiment includes a multilevel cache system, it is noted that the present invention can be incorporated into a system which includes only a single cache system. The multilevel cache system comprises a first level cache system (FIG. 2), which is preferably located on the CPU chip 42, and a second level cache system 44. The second level cache system 44 includes logic according to the present invention which reduces the snooping requirements and reduces latency problems in the first level cache system. The processor card P also includes a memory controller 46 and a data buffer/latch (EBB) 48. Various miscellaneous support logic (not shown) is also included on the processor board P. Additionally, an amount of base memory 50, for example, 4 Mbytes, is preferably located on the processor board P. This memory 50 is utilized with the buffer/latch 48 and is directly controlled by the memory controller 46.

Due to space limitations and the number of complex components on the processor board P, a separate memory board M is preferably located in the interchangeable slot 20B. The memory board M preferably contains a pair of data buffers/latches (EBBs) 48. Additionally, row address strobe (RAS) logic 52 and various other buffering logic 58 are located on the memory board M. Finally, a series of locations 54 for receiving memory are provided on the memory board M. This allows memory expansion to be easily developed on the memory board M. The control signals for the memory board M are transmitted from the memory controller 46 on the processor board P through the host bus on the system board S and up to the memory board M.

The computer system C also may contain a plurality of input/output related interchangeable cards. For example, in the system shown in FIG. 1, the interchangeable card 56 preferably is a video card which is interconnected with a monitor. In addition, the card 57 is preferably an intelligent bus master which is capable of operating cycles on both the EISA bus and the host bus and can access memory located on the host bus. Numerous other cards can be installed as is conventional. The bus master card 57, as well as other devices (not shown), may execute cycles on the host bus to access memory when the CPU 42 is not in control of the bus. For the remainder of this description, non-processor host bus cycles are referred to simply as bus master cycles for convenience.

Description of the First and Second Level Cache Systems

Figure 2:
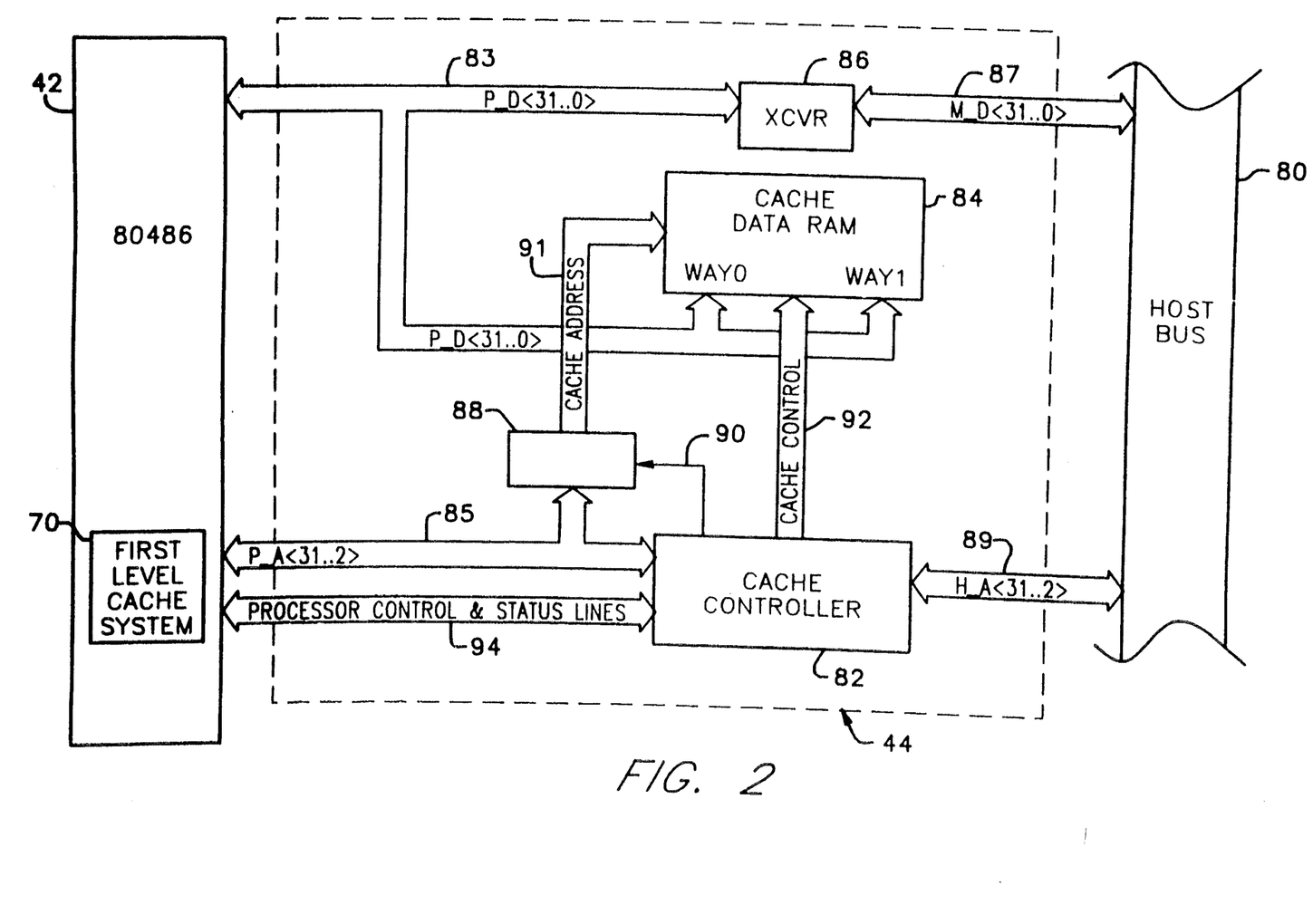
FIG. 2 is a block diagram illustrating the first level and second level cache systems.

Referring now to FIG. 2, a diagram illustrating the second level cache 44 coupled between the CPU 42 and the host bus 80 is shown. As previously mentioned, the CPU 42 is preferably the i486 microprocessor from Intel Corporation in the disclosed embodiment. The 486 processor 42 includes an on-chip cache 70, also referred to as the first level cache. The cache 70 is preferably a write-through cache, although it is noted that the snoop reduction method of the present invention may be implemented where the cache 70 is a write-back cache. If the cache 70 is implemented as a write-back cache, the cache 70 would not be allowed to update or modify data on snoop write hits, but rather would only be allowed to update or modify data on processor write hits. Otherwise, cache coherency problems would occur. In addition, if the cache 70 is implemented as a write-back cache, the snoop reduction method could include host bus snoop read cycles as well as write cycles.

The 486 processor on-chip cache 70 includes a cache enable input referred to as KENL (not shown), which is used to determine if the address in a current cycle is cacheable. When the 486 processor 42 generates a cycle that can be cached and the KENL input is asserted low, the cycle becomes a cache line fill cycle. For more information on the KENL input to the 486 processor 42, please see the Intel i486 Microprocessor Handbook, November 1989 edition, pgs. 10 and 74, published by Intel Corporation, which is hereby incorporated by reference.

The 486 processor on-chip cache 70 also includes two inputs referred to as AHOLD and EADSL (both not shown) used in snoop cycles or cache invalidation cycles. A cache invalidation cycle in the cache 70 is controlled by logic external to the CPU 42 and comprises two steps. First, when a host bus write cycle is being performed which must be snooped, for example, a write cycle by the bus master 57, the external logic asserts the AHOLD input to the 486 CPU 42, forcing the processor 42 to immediately relinquish its address bus. Next, the external logic asserts the external address signal EADSL which indicates, when asserted low, that a valid address is on the 486 processor's address pins. The cache 70 then reads the address and performs a tag compare cycle, also referred to as a cache invalidation cycle. If a snoop write hit occurs, i.e., if the cache 70 determines that a copy of data from this location resides in the cache, then the respective cache line is invalidated. For more information on cache invalidation cycles in the 486 processor on-chip cache, please see the Intel i486 Microprocessor Handbook, pgs. 111-113, referenced above.

It is noted that running an invalidation cycle in the cache 70 prevents the cache 70 from satisfying other requests from the CPU 42. Thus the snooping responsibilities of the cache 70 reduce the efficiency of the processor 42 when the processor 42 does not have control of the host bus 80. Therefore it is generally desired that invalidation or snoop cycles should only be run by the cache 70 when absolutely necessary.

The second level cache 44 includes a cache controller 82 and cache memory comprising a cache data RAM 84. The CPU 42 includes a 32 bit data bus 83 comprising signals P_D<31..0>. The CPU 42 also includes an address bus 85 comprising address lines P_A<31..2>. The host bus 80 includes a data bus 87 and address bus 89 comprising signals H_D<31..0> and H_A<31..2>, respectively. The P_D<31..0> signals from the CPU 42 are coupled through a transceiver 86 to the H_D<31..0> signals. The P_D<31..0> signals are also provided from the CPU 42 to the cache data RAM 84. In the preferred embodiment, the cache data RAM 84 is organized as a 2-way set associative cache, and thus the P_D<31..0> signals are provided to each way of the cache, as shown. The P_A<31..2> signals are provided from the CPU 42 to the cache controller 82 and are also provided through a latchable transceiver 88 to the cache data RAM 84 through a cache address bus 91. The cache controller 82 provides a gating signal 90 to the transceiver 88. The cache controller 82 is also connected to the H_A<31..2> signals. Various processor control and status lines 92 are provided from the cache controller 82 to the cache data RAM 84. In addition, various control and status signals 94 are provided between the cache controller 82 and the on-chip cache 70 located in the CPU 42.

The cache controller 82 snoops addresses during cycles on the host bus 80 when the CPU 42 is not in control of the host bus 80. The cache controller 82 is preferably organized as a write-back cache, and thus the cache controller 82 must snoop both write and read operations. In the disclosed embodiment, the on-chip or first level cache 70 is a write-through cache. As explained in the background, a write-through cache is only required to snoop host bus write operations. In the disclosed embodiment, the cache controller 82 includes logic which directs the snooping operations of the first level cache 70. When the first level cache is required to snoop a bus cycle, the second level cache controller 82 provides the current host bus address over the P_A<31..2> lines to the first level cache 70, and the logic asserts respective control signals directing the on-chip cache 70 to snoop during certain bus master write operations, as is explained below.

Figure 3:
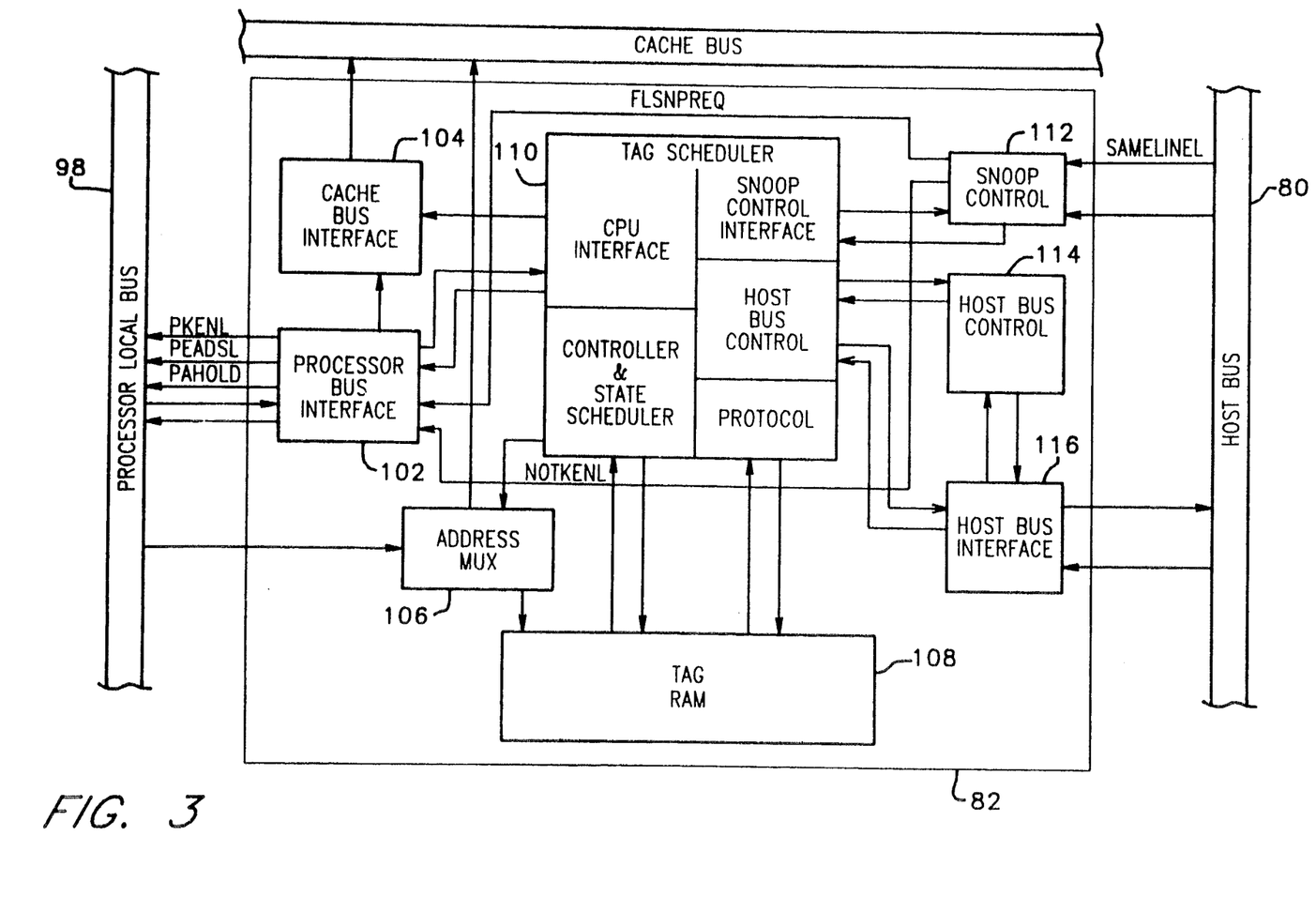
FIG. 3 is a more detailed block diagram of the second level cache controller of FIG. 2.

Description of the Second Level Cache Controller of FIG. 3

Referring now to FIG. 3, the cache controller 82 of the second level cache system 44 is shown. The cache controller 82 is interfaced between a processor local bus 98 of the CPU 42, the host bus 80, and a cache bus comprising the cache address bus 91 and cache control bus 92 (FIG. 2). The cache bus, in turn, is coupled to the cache data RAM 84 (FIG. 2).

The cache controller 82 includes a processor bus interface block 102 which tracks the states of the CPU 42 in order to maintain correct synchronization with the CPU 42. The processor bus interface block 102 is connected to the processor local bus 98 and generates a cache enable signal referred to as PKENL, which is provided to the KENL input of the on-chip cache 70. When the cache controller 82 negates the PKENL signal to the on-chip cache 70, the cache 70 is prevented from allocating a line to the respective address that has been presented to the cache 70. As described below, the PKENL signal is generated in conjunction with other logic in the cache controller 82 and is used according to the present invention to designate as noncacheable certain first level cache allocations where snooping has been disabled and cache coherency problems could occur.

The processor bus interface block 102 also generates two signals referred to as PAHOLD and PEADSL, which are provided to the AHOLD and EADSL inputs of the 486 processor on-chip cache 70. The cache controller 82 uses the PAHOLD and PEADSL signals to control the snooping operations of the cache 70. The PEADSL and PAHOLD signals are generated in a manner to reduce the snooping requirements of the cache 70 and reduce latency problems, as is explained below.

The processor bus interface block 102 is connected to a cache bus interface block 104. The cache bus interface block 104 is connected to the cache bus and provides addresses and signals which control CPU and host bus access to the cache data RAM 84 (FIG. 2). An address multiplexor (address MUX) block 106 is coupled to the processor local bus 92, the cache bus, and is also coupled to tag RAM 108. The tag RAM 108 holds the tags or upper address bits of the address locations corresponding to the data stored in the cache data RAM 84. The address MUX block 106 provides the proper address information to the tag memory 108.

The cache controller 82 includes a tag scheduler block 110. The tag scheduler block 110 is partitioned into sub-units referred to as CPU interface, controller and state scheduler, snoop control interface, host bus control, and protocol. The controller and state schedule portion and the protocol portion are connected to the tag RAM 108. The controller and state scheduler portion is also connected to the address MUX block 106. The CPU interface portion is connected to the processor bus interface block 102 and the cache bus interface block 104. The snoop control interface portion is connected to a logic block referred to as the snoop control block 112. The host bus control portion is connected to logic blocks referred to as the host bus control block 114 and the host bus interface block 116. The primary function of the tag scheduler block 110 is to arbitrate priority for accesses to the tag RAM 108 between the CPU 42 and the host bus 80. This function is primarily performed by the controller and state scheduler portion and the protocol portion. The CPU interface portion is primarily concerned with handling CPU read and write requests to the cache data RAM 84. The snoop interface portion is primarily concerned with snoop accesses to the tag RAM 108. The host bus control portion is primarily concerned with coordinating write-back cycles to the host bus 80.

The primary function of the snoop control block 112 is to watch the host bus 80 for any read or write memory cycles to cacheable main memory locations and help direct the snooping operations of the first level and second level caches 70 and 44. The snoop control block 112 notifies the tag scheduler block 110 of any valid snoop activity occurring on the host bus 80 to gain access to the tag RAM 108 for snooping purposes. The snoop control block 112 also includes logic according to the present invention which generates a first level cache snoop request signal referred to as FLSNPREQ to the processor bus interface block 102. The snoop control block 112 asserts the FLSNPREQ signal to indicate that the first level cache 70 should perform a snoop cycle or invalidation cycle. The FLSNPREQ signal is used by the processor bus interface block 102 in the generation of the PEADSL signal, as is explained below.

The snoop control block 112 receives a signal referred to as SAMELINEL from SAMELINE generation logic in the memory controller 46. The SAMELINEL signal is provided from the memory controller 46 through the host bus 80 to the snoop control block 112. The SAMELINEL signal indicates, when asserted low, that the snoop address of the current bus master host bus write cycle is within the same memory line as the immediately previous bus master write cycle. The SAMELINEL signal is used to determine if snoop write cycles must be forwarded to the first level cache 70 for snooping purposes.

The snoop control block 112 also provides a signal referred to as NOTKENL to the processor bus interface block 102. When the NOTKENL signal is asserted low, the processor bus interface block 102 deasserts the PKENL signal to the first level cache 70, directing the fist level cache 70 to not allocate the current address provided to the first level cache 70. As described below, the NOTKENL signal is asserted in certain situations where the first level cache was directed not to snoop a write cycle on the host bus 80 and cache coherency problems could occur.

The host bus control block 114 arbitrates for control of the host bus 80 in response to a request from the tag scheduler block 110. The host bus control block 114 runs cycles compatible with the CPU cycles which it is designed to emulate. The host bus control block 114 is connected to the host bus control portion in the tag scheduler block 110 and is also connected to the host bus interface block 116. The host bus interface block 116 is connected to the host bus control portion in the tag scheduler 110, the host bus control block 114, and to the host bus 80. The host bus interface block 116 acts as an interpreter between the tag scheduler 110 and the host bus control block 114.

In the disclosed embodiment, a multilevel cache system is disclosed, and the logic that controls the snooping operation of the first level cache 70 according to the present invention resides in the second level cache controller 82. It is noted that the present invention may also be incorporated into a system which includes only a single cache. In a single cache system, the various logic referenced above which asserts the PAHOLD, PEADSL, and PKENL signals would be separate from, or part of, the cache system 70 and coupled to the host bus 80.

Figure 4:
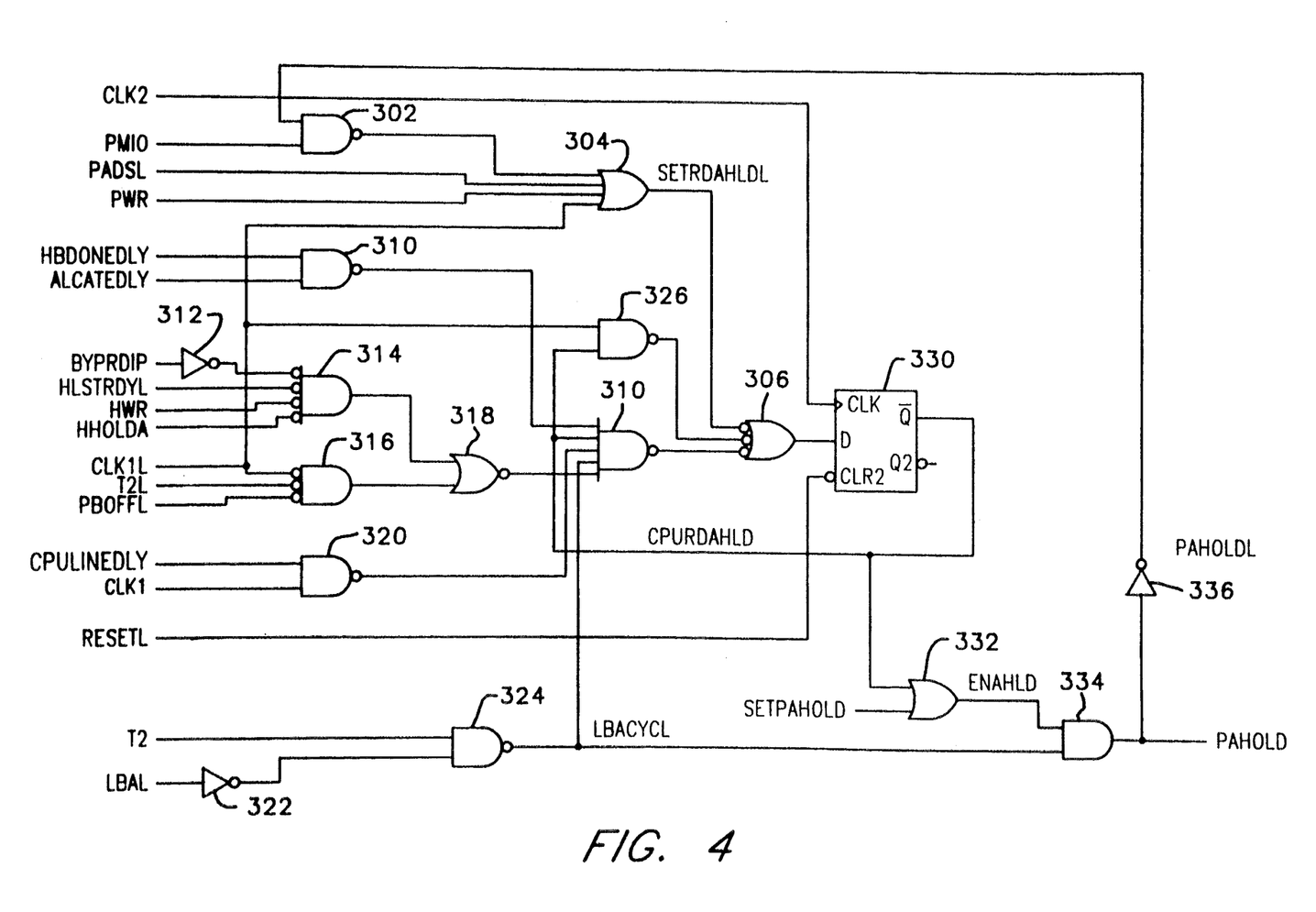
FIG. 4 is a schematic logic diagram of latency reduction logic in the processor bus interface block of FIG. 3.

Brief Review of the Snoop Reduction Method
Latency Reduction Logic in the Processor Bus Interface Block Referring now to FIG. 4, the processor bus interface block 102 includes logic according to the present invention which reduces latency problems in the first level cache 70. This logic asserts the PAHOLD signal to the AHOLD input of the CPU 42 after every CPU read cycle that is transmitted beyond the first level cache 70. A brief review of the signal names used in this logic is deemed appropriate. A signal referred to as PMIO is a processor memory-input/output signal which is high during processor memory cycles and is low during processor I/O cycles. A signal referred to as PADSL is the processor address status signal. A signal referred to as PWR is the processor write/read signal. A signal referred to as HBDONEDLY is indicative of a host bus cycle completing. The HBDONEDLY signal is asserted one CLK2 cycle after the host bus ready signal is returned by the system. A signal referred to as ALCATEDLY indicates that an allocation As occurring to the second level cache.

A signal referred to as BYPRDIP indicates that a bypass read is An progress, meaning that the CPU 42 is running a read cycle to the host bus for data that will be provided to the processor 42 and that will not be cached in either of the first level or second level caches 70 and 44. These cycles include noncacheable address or NCA cycles, and locked cycles, which are not cached. A signal referred to as HLSTRDYL is a ready signal indicating that the last cycle of a burst transfer or BYPRDIP cycle has completed. A signal referred to as HHOLDA is a host hold acknowledge signal from the host bus 80 which indicates that the host bus 80 has acknowledged a hold request.

A signal referred to as T2L indicates, when asserted low, that a CPU cycle is in its T2 state, meaning that the cycle is in progress and the processor address strobe signal PADSL has already been asserted. When a cycle is in the T2 state, the CPU 42 is either sending data or waiting to receive data. A signal referred to as T2 is an inverted version of the T2L signal. A signal referred to as PBOFFL is a signal provided to the 486 back-off or BOFFL input. The asserted PBOFFL signal forces the 486 processor 42 to float its bus in the next CLK1 signal cycle. A signal referred to as CPULINEDLY indicates, when asserted high, that a read hit has occurred in the secondary cache 44 and the CPU 42 is retrieving data from the secondary cache 44. A signal referred to as LBAL indicates, when asserted low, that the CPU 42 is performing a local bus access cycle on its processor bus 98 (FIG. 3).

A signal referred to as CLK1 is a clocking signal having a frequency of 33 MHZ and is preferably the clock signal provided to CPU 42. A signal referred to as CLK1L is an inverted CLK1 signal. A signal referred to as CLK2 is a clocking signal having a frequency of 66 MHz or twice the CLK1 signal. Preferably, the CLK2 signal has a rising edge at the same time the CLK1 signal has a rising edge. A signal referred to as HWR is host bus write/read signal which is asserted high during write cycles and negated low during read cycles. A signal referred to as RESETL is a system reset signal which is asserted low.

The PMIO signal and the PAHOLDL signal are connected to inputs of a two input NAND gate 302. The output of the NAND gate 302 is connected to an input of a four input OR gate 304. Other inputs to the OR gate 304 are the PADSL signal, the PWR signal, and the CLK1L signal. The output of the OR gate 304 is a signal referred to as SETRDAHLDL. The HBDONEDLY and the ALCATEDLY signals are connected to inputs of a two input NAND gate 308 whose output is connected to an input of a five input NAND gate 310. The BYPRDIP signal is connected through an inverter 312 to an input of a four input NOR gate 314. Other inputs to the NOR gate 314 are the HLSTRDYL signal, the HWR signal, and the HHOLDA signal.

The CLK1L signal, the T2L signal, and the PBOFFL signal are connected to inputs of a three input NOR gate 316. The outputs of the NOR gates 314 and 316 are connected to inputs of a two input NOR gate 318 whose output is connected to the NAND gate 310. The CPULINEDLY signal and the CLK1 signal are connected to inputs of a two input NAND gate 320 whose output is connected to the NAND gate 310. The LBAL signal is connected through an inverter 322 to an input of a two input NAND gate 324. The other input to the NAND gate 324 receives the T2 signal. The output of the NAND gate 324 is a signal referred to as LBACYCL, which is connected to an input of the NAND gate 310. The LBACYCL signal indicates, when asserted low, that a local bus access cycle is occurring, and the cycle is in the T2 state. A signal referred to as CPURDAHLD is connected to the remaining input of the NAND gate 310.

The CPURDAHLD signal and the CLK1L signal are connected to inputs of a two input NAND gate 326. The SETRDAHLDL signal output from the OR gate 304 and the outputs from the NAND gates 326 and 310 are connected to inputs of a three input NAND gate 306. The output of the NAND gate 306 is connected to the D input of a D-type flip-flop 330. The clock input of the flip-flop 330 receives the CLK2 signal and the inverted clear input receives the system reset signal RESETL. The Q output of the flip-flop 330 is the CPURDAHLD signal. The CPURDAHLD signal is connected to an input of a two input OR gate 332. The other input to the OR gate receives a signal referred to as SETPAHOLD. The SETPAHOLD signal indicates other conditions where the PANOLD signal should be asserted. One condition is during a power-up reset where the PANOLD signal is asserted to direct the 486 CPU 42 to begin its power-on self test or POST procedure. Another condition is during snoop read hits to the second level cache 44 which require write-back cycles. Other conditions may also be included.

The output of the OR gate 332 is a signal referred to as ENANLD, which is connected to an input of a two input AND gate 334. The LBACYCL signal is connected to the other input of the AND gate 334. The output of the AND gate 334 is the PANOLD signal. The LBACYCL signal prevents the PAHOLD signal from being asserted when a processor local bus access cycle is occurring and the cycle is in the T2 state. The PANOLD signal is connected through an inverter 336 to form the PAHOLDL signal.

The PANOLD signal is provided to the ANOLD input of the 486 CPU 42 and is asserted after every CPU read cycle that advances beyond the first level cache 70. The OR gate 304 which generates the SETRDAHLDL signal is responsible for setting the flip-flop 330, and hence for asserting the PANOLD signal, after every CPU read advancing beyond the first level cache 70. Once the flip-flop 330 is set, the CPURDAHLD signal is asserted. The NAND gate 326 maintains the flip-flop 330 asserted during the period when the CLK1 signal is low. The NAND gate 310 maintains the flip-flop 330 asserted thereafter.

Certain conditions can occur which clear the flip-flop 330 and deassert the PAHOLD signal. These conditions are represented by the gates 308, 314, 316, and 320. The NAND gate 308 deasserts the PAHOLD signal when an allocate cycle completes to the second level cache 44. The NOR gate 314 deasserts the PAHOLD signal when the last ready signal is returned from either a burst cycle or a bus ready in progress cycle. The NOR gate 316 deasserts the PAHOLD signal when the PBOFF signal is asserted low. When the PBOFFL signal is asserted, the CPU 42 is forced into its back-off state, and thus the PAHOLD signal no longer need be asserted. The NAND gate 320 deasserts the PAHOLD signal during a CPU read hit to the secondary cache. When this occurs, the data from the second level cache will be immediately provided to the first level cache 70 and the CPU 42, and thus there will be insufficient time to allow any snoops by the first level cache 70 during this time. Therefore, when this situation occurs, the PAHOLD is deasserted. Finally, the PAHOLD signal is not asserted when the LBACYCL signal is asserted low because local bus access cycles performed by the CPU 42 should not be interrupted.

Conclusion

Therefore, a method and apparatus for reducing the snooping requirements of a cache system are disclosed. When a snoop access occurs to a line of the cache, further snoop accesses to that line are unnecessary when the same memory line is being accessed, and thus the cache is relieved of this snooping burden. Because a multilevel cache system is implemented in the disclosed embodiment, the first level cache is directed to snoop in all cases where a read hit occurs to a modified location in the second level cache. In addition, an attempted first level cache allocation is declared non-cacheable if it occurs within a period of time after a snoop write request has been blocked. Also, a method and apparatus for reducing the latency of a cache system is disclosed. When a cache system has the dual requirement of servicing processor accesses and snooping the host bus, latency problems can occur during snoop accesses. Logic according to the present invention gains access to the address inputs of the cache system after every processor read that propagates beyond the cache system so that the address inputs are available for snooping purposes.

The foregoing disclosure and description of the invention are illustrative and explanatory thereof, and various changes in the components and details of the illustrated circuitry, as well as the construction and method of operation of the invention, may be made without departing from the spirit of the invention.

We claim:

1. An apparatus for reducing latency problems in a cache system, comprising:
   a system bus;
   memory coupled to said system bus;
   a processor coupled to said system bus which can access said memory using said system bus;
   a cache system coupled between said processor and said system bus which generates a read allocation request to allocate data into the cache system and snoops addresses presented to its address inputs, wherein said cache system also services requests from said processor when said processor is not using said system bus; and
   means coupled to said cache system for gaining access to said cache system address inputs for snooping purposes immediately after said cache system generates a read allocation request.

2. The apparatus of claim 1, further comprising:
   means coupled to said cache system for terminating access to said cache system address inputs when said read allocation is completed.

3. The apparatus of claim 2, further comprising:
   a second cache system coupled between said cache system and said system bus; and
   means coupled to said cache system and to said second cache system for terminating access to said cache system address inputs when a read hit occurs to said second cache system.

* * * * *

UNITED STATES PATENT AND TRADEMARK OFFICE
CERTIFICATE OF CORRECTION

PATENT NO.   :   5,446,863
DATED        :   AUG. 29, 1995
INVENTOR(S)  :   STEVENS ET AL.

It is certified that error appears in the above-identified patent and that said Letters Patent is hereby corrected as shown below:

Title page, item [54] and col. 1, lines 1-2:

In the title, please replace "CACHE SNOOP LATENCY PREVENTION APPARATUS" with --APPARATUS FOR REDUCING CACHE SYSTEM LATENCY BY GAINING ACCESS TO CACHE ADDRESS INPUTS IMMEDIATELY AFTER A CACHE READ ALLOCATION--.

Signed and Sealed this

Twenty-eighth Day of November 1995

Attest:

BRUCE LEHMAN

*Attesting Officer*      *Commissioner of Patents and Trademarks*